(12) United States Patent
Johnston (10) Patent No.: US 12,123,717 B2
(45) Date of Patent: Oct. 22, 2024

(54) TOTAL STATION WITH COMPENSATION FOR MISALIGNED OPTICAL AIMING POINT

(71) Applicant: Trimble Inc., Sunnyvale, CA (US)

(72) Inventor: Wayne Johnston, Broomfield, CO (US)

(73) Assignee: Trimble Inc., Westminster, CO (US)

( * ) Notice: Subject to any disclaimer, the term of this patent is extended or adjusted under 35 U.S.C. 154(b) by 472 days.

(21) Appl. No.: 17/570,922

(22) Filed: Jan. 7, 2022

(65) Prior Publication Data

US 2023/0221118 A1 Jul. 13, 2023

(51) Int. Cl.
*G01C 15/00* (2006.01)
*G06T 7/73* (2017.01)
*G01S 17/08* (2006.01)

(52) U.S. Cl.
CPC .............. *G01C 15/008* (2013.01); *G06T 7/73* (2017.01); *G01S 17/08* (2013.01)

(58) Field of Classification Search
CPC .................................................... G01C 15/008
USPC ........................................................... 33/228
See application file for complete search history.

(56) References Cited

U.S. PATENT DOCUMENTS

| | | | | |
|---|---|---|---|---|
| 4,171,907 A * | 10/1979 | Hill | ...................... | G01C 15/002 356/5.11 |
| 6,171,018 B1 * | 1/2001 | Ohtomo | ................ | E01C 19/006 404/84.1 |
| 7,623,224 B2 * | 11/2009 | Vogel | ..................... | G01C 15/00 356/141.5 |
| 9,377,298 B2 * | 6/2016 | Zogg | ...................... | G01B 11/27 |
| 10,753,740 B2 * | 8/2020 | Kotzur | ................. | G01C 15/008 |
| 11,519,723 B1 * | 12/2022 | Gasmi | ................... | G01S 7/4816 |
| 11,592,291 B2 * | 2/2023 | Sasaki | ..................... | G01C 15/06 |
| 11,629,957 B2 * | 4/2023 | Sasaki | ..................... | G02B 23/12 356/614 |
| 11,946,218 B1 * | 4/2024 | Jaycox | ................... | E02D 13/04 |
| 2007/0139262 A1 * | 6/2007 | Scherzinger | .......... | G01S 19/485 701/472 |
| 2011/0131824 A1 | 6/2011 | Yanobe et al. | | |
| 2013/0250284 A1 | 9/2013 | Lienhart et al. | | |
| 2020/0348133 A1 * | 11/2020 | Eisenreich | .......... | G01C 15/004 |
| 2021/0123735 A1 * | 4/2021 | Komposch | .......... | G01C 15/008 |
| 2022/0065629 A1 * | 3/2022 | Shimizu | ................. | E02D 17/20 |

(Continued)

OTHER PUBLICATIONS

Extended European Search Report for Application No. 22214210.1-1009, mailed Jun. 12, 2023, 9 pages.

*Primary Examiner* — George B Bennett
(74) *Attorney, Agent, or Firm* — Kilpatrick Townsend & Stockton LLP (57) ABSTRACT

A total station includes a telescope, an EDM unit, and an onboard computer. The telescope is manually adjusted by a user to cause a target to be set at last partially within an FOV of the EDM unit. After the manual adjustment, an optical aiming point associated with the telescope is misaligned from a center point of the target by an offset angle. A user input indicating that the manual adjustment has been performed is received via a user interface. In response to the user input, a slope distance is measured using the EDM unit and an angle associated with the optical aiming point is measured. The offset angle is computed based on the slope distance, and an angle associated with the center point of the target is computed based on the angle associated with the optical aiming point and the offset angle.

20 Claims, 8 Drawing Sheets

(56) References Cited

U.S. PATENT DOCUMENTS

| | | | |
|---|---|---|---|
| 2023/0168377 A1* | 6/2023 | Kikuchi | G01S 17/42 356/4.01 |
| 2023/0221118 A1* | 7/2023 | Johnston | G06T 7/73 33/228 |

* cited by examiner

TOTAL STATION WITH COMPENSATION FOR MISALIGNED OPTICAL AIMING POINT

BACKGROUND OF THE INVENTION

A total station is an electronic/optical instrument that is capable of making angle, distance, and coordinate measurements. A total station may be a combination of a theodolite and an electronic distance measurement (EDM) device, and may further include computer components such as processors, memory, and a display providing a user interface. Typically, a total station is used for surveying and building construction, however other applications are possible. While a conventional total station (or mechanical total station (MTS)) may require two people to operate, a robotic total station (RTS), which provides remote control, can be operated by one person.

For a simple angle measurement, the total station may be set up at a first location, and two pole-mounted prisms (i.e., targets) may be set up at distances away from the total station at a second and a third location. The total station may be controlled to sight the first pole-mounted prism, and the horizontal angle reading may be set to zero. The total station may then be horizontally rotated until sighting the second pole-mounted prism, and the horizontal angle difference may be measured and presented to a user (e.g., on the display). Alternatively, an angle may be measured from a reference direction (e.g., North) to a single pole-mounted prism.

For a simple distance measurement, the total station may be set up at a first location, and a single pole-mounted prism may be set up at a distance away from the total station at a second location. The total station may be controlled to sight the pole-mounted prism, and a distance measurement along with a vertical angle measurement may be made. Using these measurements, a horizontal distance and a vertical distance between the total station and the prism may be calculated and presented to a user.

For a simple coordinate measurement, the total station is set up at a reference point that has a known coordinate (e.g., X, Y, and Z; or easting, northing, and elevation). In some instances, the known coordinate may be determined using a Global Navigation Satellite System (GNSS) receiver, such as the United States' Global Positioning System (GPS). A single pole-mounted prism is then set up at a distance away from the total station at a second location. One or more distance and angle measurements may then be made to determine the coordinate of the prism based on the known coordinate. For example, a horizontal angle measurement may be made between North and the prism, a vertical angle measurement may be made between the horizontal direction and the prism, and a distance measurement may be made between the total station and the prism. These measurements can be used to translate the known coordinate into the coordinate of the prism.

SUMMARY OF THE INVENTION

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a method of operating a total station, the method comprising: receiving a manual adjustment of a telescope of the total station to set a target at last partially within a field of view (FOV) of an electronic distance measurement (EDM) unit of the total station, wherein, after the manual adjustment, an optical aiming point associated with the telescope is misaligned from a center point of the target by an offset angle; receiving, via a user interface of the total station, a user input indicating that the manual adjustment has been performed; in response to receiving the user input: measuring a slope distance between the total station and the target using the EDM unit; and measuring an angle associated with the optical aiming point; computing the offset angle between the optical aiming point and the center point of the target based on the slope distance; and computing an angle associated with the center point of the target based on the angle associated with the optical aiming point and the offset angle.

Example 2 is the method of example(s) 1, further comprising: in response to receiving the user input: capturing, using a pixelated image sensor of the total station, a matrix of light values; and determining a position of the center point of the target based on the matrix of light values.

Example 3 is the method of example(s) 2, wherein the EDM unit and the pixelated image sensor are configured to receive light entering into the telescope.

Example 4 is the method of example(s) 2, further comprising: generating a digital aiming point within a digital frame; in response to receiving the user input, moving the digital aiming point from a first digital aiming point position to a second digital aiming point position to align with the position of the center point of the target; and determining a digital distance between the first digital aiming point position and the second digital aiming point position.

Example 5 is the method of example(s) 4, wherein the offset angle between the optical aiming point and the center point of the target is computed further based on the digital distance.

Example 6 is the method of example(s) 4, further comprising: displaying, on a display of the total station, the digital frame including the digital aiming point.

Example 7 is the method of example(s) 1, further comprising: in response to receiving the user input: locking the telescope to temporarily prevent further manual adjustment of the telescope.

Example 8 is the method of example(s) 1, wherein the target includes a reflector prism.

Example 9 is the method of example(s) 1, wherein the total station lacks rotary actuators that perform automatic adjustment of the telescope.

Example 10 is a non-transitory computer-readable medium comprising instructions that, when executed by one or more processors, cause the one or more processors to perform operations comprising: receiving, via a user interface of a total station, a user input indicating that a manual adjustment of a telescope of a total station has been performed, the manual adjustment causing a target to be set at last partially within a field of view (FOV) of an electronic distance measurement (EDM) unit of the total station, wherein, after the manual adjustment, an optical aiming point associated with the telescope is misaligned from a center point of the target by an offset angle; in response to receiving the user input: causing a slope distance between the total station and the target to be measured using the EDM unit; and causing an angle associated with the optical aiming point to be measured; computing the offset angle between the optical aiming point and the center point of the target based on the slope distance; and computing an angle associated with the center point of the target based on the angle associated with the optical aiming point and the offset angle.

Example 11 is the non-transitory computer-readable medium of example(s) 10, wherein the operations further comprise: in response to receiving the user input: causing a matrix of light values to be captured using a pixelated image sensor of the total station; and determining a position of the center point of the target based on the matrix of light values.

Example 12 is the non-transitory computer-readable medium of example(s) 11, wherein the operations further comprise: generating a digital aiming point within a digital frame; in response to receiving the user input, moving the digital aiming point from a first digital aiming point position to a second digital aiming point position to align with the position of the center point of the target; and determining a digital distance between the first digital aiming point position and the second digital aiming point position.

Example 13 is the non-transitory computer-readable medium of example(s) 12, wherein the offset angle between the optical aiming point and the center point of the target is computed further based on the digital distance.

Example 14 is the non-transitory computer-readable medium of example(s) 12, wherein the operations further comprise: displaying, on a display of the total station, the digital frame including the digital aiming point.

Example 15 is the non-transitory computer-readable medium of example(s) 10, wherein the operations further comprise: in response to receiving the user input: locking the telescope to temporarily prevent further manual adjustment of the telescope.

Example 16 is a total station comprising: a telescope; an electronic distance measurement (EDM) unit integrated with the telescope, wherein a manual adjustment of the telescope causes a target to be set at last partially within a field of view (FOV) of the EDM unit, wherein, after the manual adjustment, an optical aiming point associated with the telescope is misaligned from a center point of the target by an offset angle; an onboard computer communicatively coupled to the EDM unit, the onboard computer configured to: receive, via a user interface of the total station, a user input indicating that the manual adjustment has been performed; in response to receiving the user input: cause a slope distance between the total station and the target to be measured using the EDM unit; and cause an angle associated with the optical aiming point to be measured; compute the offset angle between the optical aiming point and the center point of the target based on the slope distance; and compute an angle associated with the center point of the target based on the angle associated with the optical aiming point and the offset angle.

Example 17 is the total station of example(s) 16, further comprising: a pixelated image sensor communicatively coupled to the onboard computer, and wherein the onboard computer is further configured to: in response to receiving the user input: cause a matrix of light values to be captured using the pixelated image sensor; and determine a position of the center point of the target based on the matrix of light values.

Example 18 is the total station of example(s) 17, wherein the EDM unit and the pixelated image sensor are configured to receive light entering into the telescope.

Example 19 is the total station of example(s) 16, wherein the target includes a reflector prism.

Example 20 is the total station of example(s) 16, wherein the total station lacks rotary actuators that perform automatic adjustment of the telescope.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

DETAILED DESCRIPTION OF THE INVENTION

In many situations, a robotic total station (RTS), which includes rotary actuators and object tracking circuitry to align the RTS's optical aiming point with a remote target, has replaced the conventional mechanical total station (MTS), which lacks such components. However, the RTS also has several drawbacks. For example, the RTS comes with additional complexity, weight, cost, and battery requirements compared to the MTS. For many users, the additional skill required to operate an RTS is an obstacle, and further presents opportunities for measurement errors to go undetected. As a result, these users continue to use the MTS despite the requirement of one user to operate the total station itself and another user to operate the target.

The described embodiments offer many of the advantages of the RTS but without the above-noted drawbacks, such as increased complexity and cost. Some embodiments of the present disclosure relate to a geodetic instrument, alternatively referred to as a total station, that can automatically compensate for an optical aiming point that is misaligned with the remote target, eliminating the need to cause rotary actuators to rotate the total station's telescope to align the optical aiming point with the center of the target. Embodiments further eliminate the tracking circuitry used in an RTS. Compared to the MTS, embodiments of the present disclosure do not require the manual focusing step, and instead employ a system that automates the measurement to the center of the target, increasing the accuracy of the work and decreasing the amount of focused work requiring concentration and user skill.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

The figures herein follow a numbering convention in which the first digit or digits correspond to the figure number and the remaining digits identify an element or component in the figure. Similar elements or components between different figures may be identified by the use of similar digits. For example, 102 may reference element "02" in FIG. 1, and a similar element may be referenced as 202 in FIG. 2. As will be appreciated, elements shown in the various embodiments herein can be added, exchanged, and eliminated so as to provide a number of additional embodiments of the present disclosure. In addition, the proportion and the relative scale of the elements provided in the figures are intended to illustrate certain embodiments of the present disclosure and should not be taken in a limiting sense.

Figure 1:
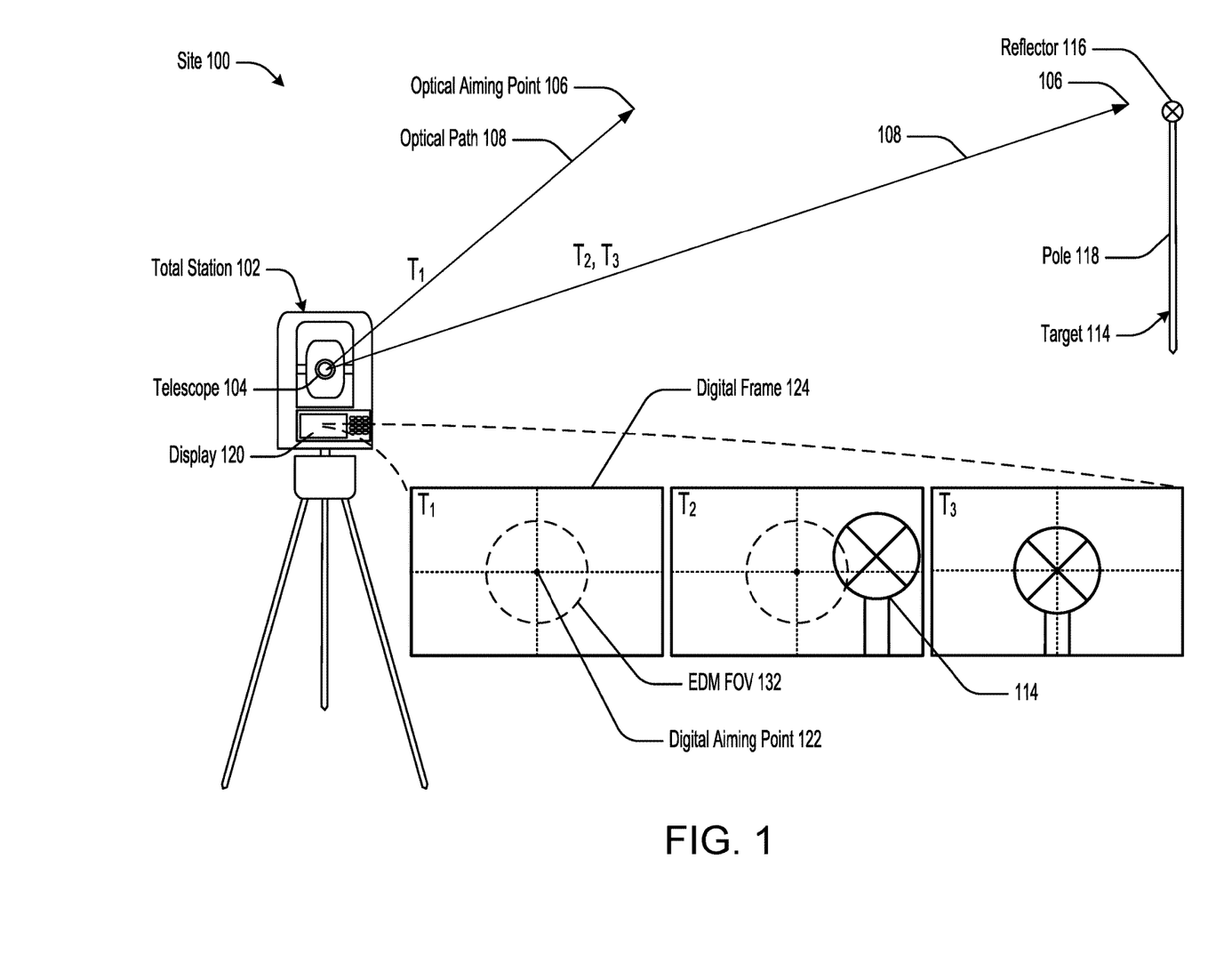
FIG. 1 illustrates an example of a total station being deployed at a site.

FIG. 1 illustrates an example of a total station 102 being deployed at a site 100, in accordance with some embodiments of the present disclosure. Site 100 may be a construction site or a surveying site, among other possibilities. In addition to total station 102, a target 114 that is remote from total station 102 may be deployed at site 100. Target 114 may include a reflector 116, such as a prism, that is mounted on top of a pole 118. Reflector 116 may reflect light coming from total station 102 back toward total station 102. In some instances, a first user may operate total station 102 and a second user may operate target 114 by, for example, holding target 114 in a vertical position and (optionally) facing reflector 116 toward total station 102.

As illustrated in FIG. 1, during operation, and prior to a manual adjustment by a user, a telescope 104 of total station 102 may be oriented such that an optical path 108 and an optical aiming point 106 associated with telescope 104 are far from target 114 at time $T_1$. For example, the user of total station 102 may orient telescope 104 in roughly the general direction of target 114 without looking through the sight of telescope 104 or observing the total station's digital display. Further at time $T_1$, a digital frame 124 may be generated that includes a digital aiming point 122, which may initially be equivalent to optical aiming point 106. Digital frame 124 may be maintained by an onboard computer and may be displayed on a display 120. Digital frame may further include an electronic distance measurement (EDM) field of view (FOV) 132 associated with an EDM unit of total station 102. EDM FOV 132 may correspond to the area of detection for the EDM unit such that, if reflector 116 of target 114 is at least partially within EDM FOV 132, the EDM unit may be capable of detecting the distance to target 114.

In some embodiments, the user of total station 102 may perform a manual adjustment of telescope 104 while looking through telescope 104 or while observing display 120 to bring optical aiming point 106 closer to reflector 116 of target 114, resulting in optical aiming point 106 and optical path 108 at time $T_2$. For example, the user may apply physical force to total station 102 to cause telescope 104 to rotate about a horizontal and/or a vertical axis while observing optical aiming point 106 or digital aiming point 122. In some embodiments, the user may bring optical aiming point 106 and/or digital aiming point 122 close enough to reflector 116 of target 114 so as to cause EDM FOV 132 to at least partially overlap with reflector 116 of target 114. When the user visually confirms that such overlap is present, the user may provide a user input (e.g., by pushing a button) to indicate that the misalignment condition has been satisfied (e.g., EDM FOV 132 at least partially overlaps with reflector 116) and that the steps to perform the misalignment compensation to automatically measure to the center of target 114 may take place.

In some instances, total station 102 may provide an indication (e.g., audio, visual, etc.) that EDM FOV 132 at least partially overlaps with reflector 116, which may notify the user that they have brought optical aiming point 106 sufficiently close to reflector 116 and that they may provide the user input to begin measurements to perform the misalignment compensation. Total station 102 may, for example, determine that the EDM measurement has sufficient accuracy (e.g., based on the signal-to-noise ratio of the EDM measurement signal) to verify that the overlap between EDM FOV 132 and reflector 116 is more than just borderline. This verification may be performed while the user is performing the manual adjustment and prior to the user providing the user input (in which case, a visual or audio indication may be provided that the system is ready to receive the user input) or after the user has finished performing the manual adjustment and has provided the user input (in which case, the system may either accept the user input or alert the user to perform another manual adjustment to bring optical aiming point 106 closer to reflector 116).

After the user provides the user input to indicate that EDM FOV 132 at least partially overlaps with reflector 116 of target 114, total station 102 may perform a series of measurements and computations. For example, the EDM unit may measure the slope distance to target 114, one or more angle sensors may measure the angles to optical aiming point 106, and a pixelated image sensor may capture a matrix of light values, which may be used to determine the position of the center point of target 114 (i.e., the center point of reflector 116) within digital frame 124. In some embodiments, at time $T_3$, digital aiming point 122 may be set to the center point of target 114, and a digital distance may be computed between digital aiming point 122 at time $T_2$ and digital aiming point 122 time $T_3$. The digital distance may be used to compute an offset angle, which may be added to the measured angle of optical aiming point 106 to compute an angle for the center of target 114.

Figure 2:
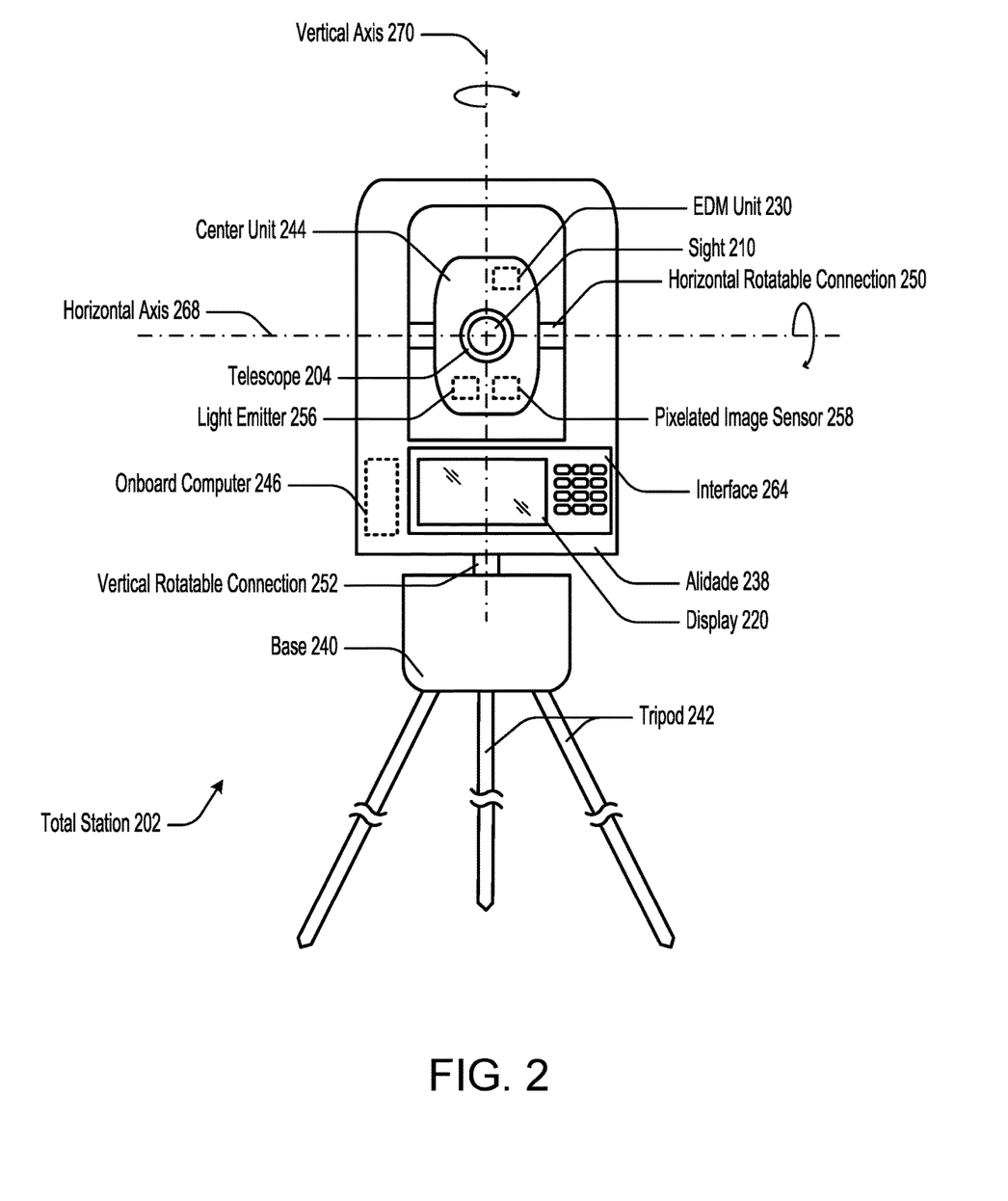
FIG. 2 illustrates an example schematic diagram of a total station.

FIG. 2 illustrates an example schematic diagram of a total station 202, in accordance with some embodiments of the present disclosure. Total station 202 may include a base 240, an alidade 238 mounted on base 240 via a vertical rotatable connection 252 for rotation about a vertical axis 270, and a center unit 244 mounted on alidade 238 via a horizontal rotatable connection 250 for rotation about a horizontal axis 268. Total station 202 may further include an onboard computer 246 that is communicatively coupled to an EDM unit 230, a light emitter 256, a pixelated image sensor 258, a display 220, and an interface 264. Onboard computer 246 may include one or more processors, memory units, and other electronics to support the receiving, processing, and outputting of various types of signals and data. While onboard computer 246 is shown as being arranged in alidade 238, it can be located elsewhere in total station 202 (e.g., in base 240) depending on the specific implementation, provided it remains communicatively coupled with the above-listed components.

In some embodiments, center unit 244 may include a telescope 204 having a sighting axis, or optical path. Telescope 204 may include a sight 210 (or eyepiece) through which a user may observe an optical aiming point identified by crosshairs or reticles. Optionally, telescope 204 may include lenses, mirrors, or other optical structures that allow distant objects to be magnified as observed by the user, while in some embodiments such magnification may not be present. Center unit 244 may also include EDM unit 230, which may be integrated with telescope 204 such that EDM unit 230 may emit light (e.g., infrared light, visible light, etc.) through the objective lens of telescope 204 along the optical axis of telescope 204 and receive reflected light through the objective lens of telescope 204. The comparison of the received signal to the emitted signal allows EDM unit 230 to determine the distance between total station 202 and the target with high accuracy. This distance may alternatively be referred to as the slope distance.

In some embodiments, center unit 244 may include a light emitter 256 and a pixelated image sensor 258, which together (or individually) may be used to determine a position of the center of the target within a digital frame, as described herein. During operation, light emitter 256 may emit light that is reflected by the target, and the reflected light may be received and detected by pixelated image sensor 258. The resulting data may include a matrix of light values, which each light value corresponding to a specific pixel in the sensor's FOV. In some embodiments, the FOV of pixelated image sensor 258 may be larger than the FOV of EDM unit 230 to allow the shape and specific position of the target to be identified within the matrix of light values, despite only a small region of the target being within the FOV of EDM unit 230. In some embodiments, light emitter 256 and/or pixelated image sensor 258 may be integrated with telescope 204 such that light emitter 256 may emit light through the objective lens of telescope 204 along the optical axis of telescope 204 and pixelated image sensor 258 may receive reflected light through the objective lens of telescope 204.

In some embodiments, one or more components of light emitter 256 and/or pixelated image sensor 258 may be shared with EDM unit 230. For example, in some embodiments, a single light emitter may be configured to emit light having a narrower FOV pattern for EDM unit 230 and separately emit light having a wider FOV pattern for light emitter 256. In some implementations, the same emitted light can be used for both EDM unit 230 and light emitter 256. In some embodiment, a single light detector may be configured to detect light at a narrower FOV for EDM unit 230 and separately detect light at a wider FOV for pixelated image sensor 258. In some embodiments, EDM unit 230 may be separate from both light emitter 256 and pixelated image sensor 258. Other possibilities are contemplated.

In some embodiments, base 240 of total station 202 may be mounted on a tripod 242. Base 240 may be a non-rotating part of total station 202 and may mounted on a tribrach for leveling purposes. In some embodiments, base 240 may be installed on tripod 242 at a desired angular orientation relative to a horizontal reference external to total station 202, such as geodetic or magnetic north, and with vertical axis 270 typically plumb. After and/or while alidade 238 is manually adjusted, a horizontal measurement signal produced by an angle sensor may indicate angular orientation of alidade 238 relative to base 240. Similarly, after and/or while center unit 244 is manually adjusted, a vertical measurement signal produced by an angle sensor may indicate angular orientation of center unit 244 relative to alidade 238.

Horizontal and vertical measurement signals may optionally be displayed on display 220, which may be any type of electronic display. In some embodiments, display 220 may be used to display the digital frame including the digital aiming point, as well as the FOV of EDM unit 230. Display 220 may also render any remote objects that are visible through telescope 204, such as the target. In this manner, the user can determine when the target is at least partially overlapping with the FOV of EDM unit 230. In some embodiments, interface 264 may be positioned adjacent to display 220 and may provide buttons or other components for allowing the user to provide inputs to total station 202. In some embodiments, interface 264 may be integrated with display 220 (e.g., a touch screen). In some embodiments, display 220 and/or interface 264 may be implemented on a portable electronic device (e.g., a smart phone) that is communicatively coupled to total station 202 via a wired or wireless connection.

While not shown in FIG. 1 (and not required by embodiments described herein), total station 202 may optionally include rotary actuators coupled to horizontal rotatable connection 250 and vertical rotatable connection 252 to provide controlled rotation of center unit 244 and likewise telescope 204 to assist the user in moving the optical aiming point near the target. For example, while not shown in FIG. 1, a controllable drive may be provided for rotating alidade 238 about vertical axis 270 in response to a horizontal angle control signal, and an angle sensor, such as an angular encoder or a magnetic or capacitive angle resolver, may produce a horizontal measurement signal, representing the horizontal angular position of alidade 238 relative to base 240. Similarly, a controllable drive may be provided for rotating the center unit 244 about horizontal axis 268 in response to a vertical angle control signal, and an angle sensor may produce a vertical measurement signal, representing the vertical angular position of center unit 244 relative to alidade 238.

Figure 3:
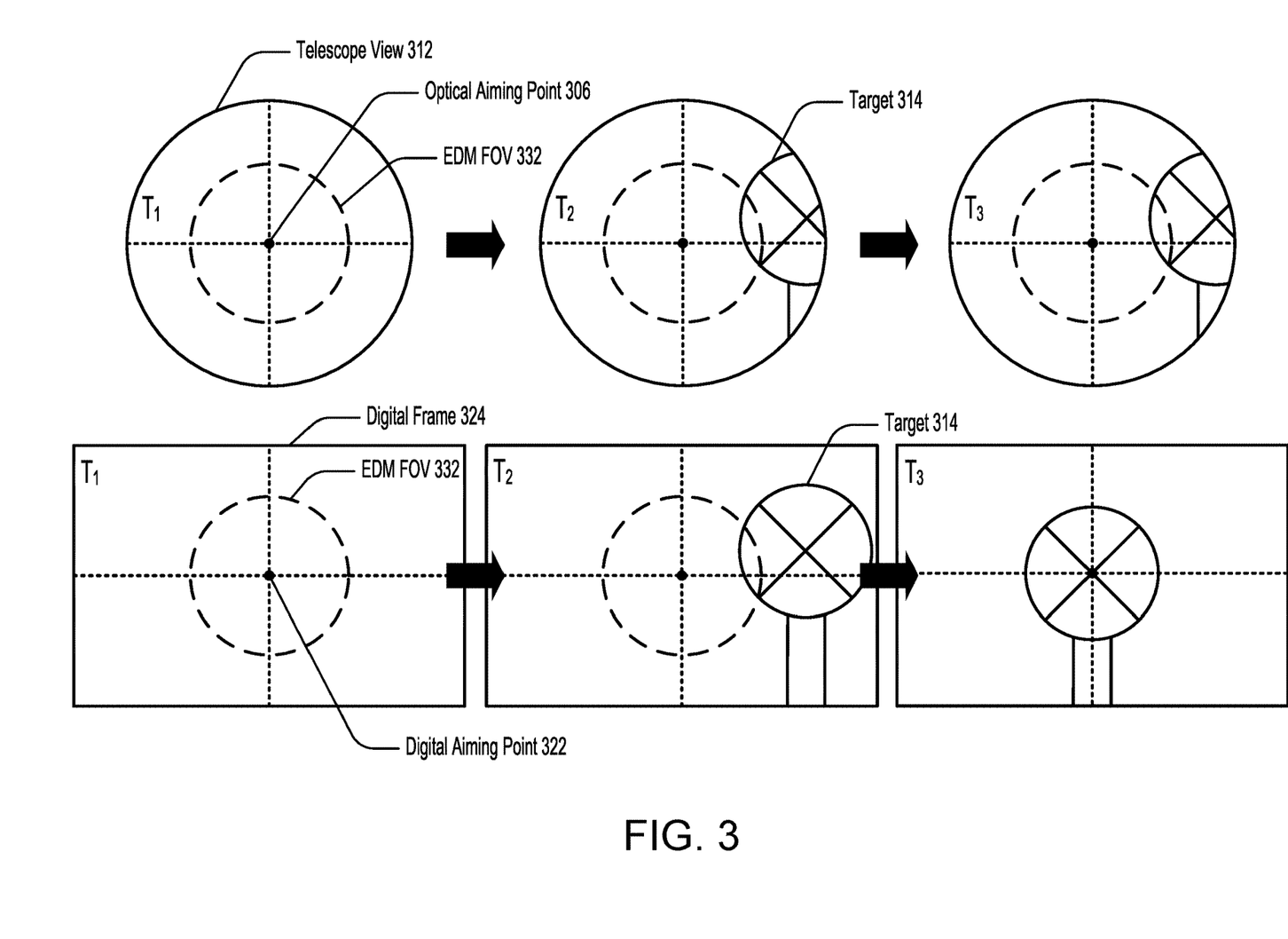
FIG. 3 illustrates example telescope views and digital frames for a total station.

FIG. 3 illustrates example telescope views 312 and digital frames 324 for a total station, in accordance with some embodiments of the present disclosure. The times $T_1$, $T_2$, and $T_3$ may correspond to those described in FIG. 1. For example, telescope view 312 and digital frame 324 at time $T_1$ may correspond to the time before a manual adjustment is made by the user when an optical aiming point 306 and digital aiming point 322 are far from a target 314. Telescope view 312 and digital frame 324 at time $T_2$ may correspond to the time after a manual adjustment has been made by the user when optical aiming point 306 and digital aiming point 322 are close to target 314 but misaligned from the center of target 314.

Telescope view 312 and digital frame 324 at time $T_3$ may correspond to the time after the user has provided a user input indicating that EDM FOV 332 at least partially overlaps with target 314, the center of target 314 within digital frame 324 has been determined, and digital aiming point 322 has moved to the center of target 314. As shown in FIG. 3, optical aiming point 306 and digital aiming point 322 are aligned at times $T_1$ and $T_2$ but are separated at time $T_3$. As such, in various embodiments, manual fine tuning of the telescope is not needed for measuring to the center of target 314.

Figure 4:
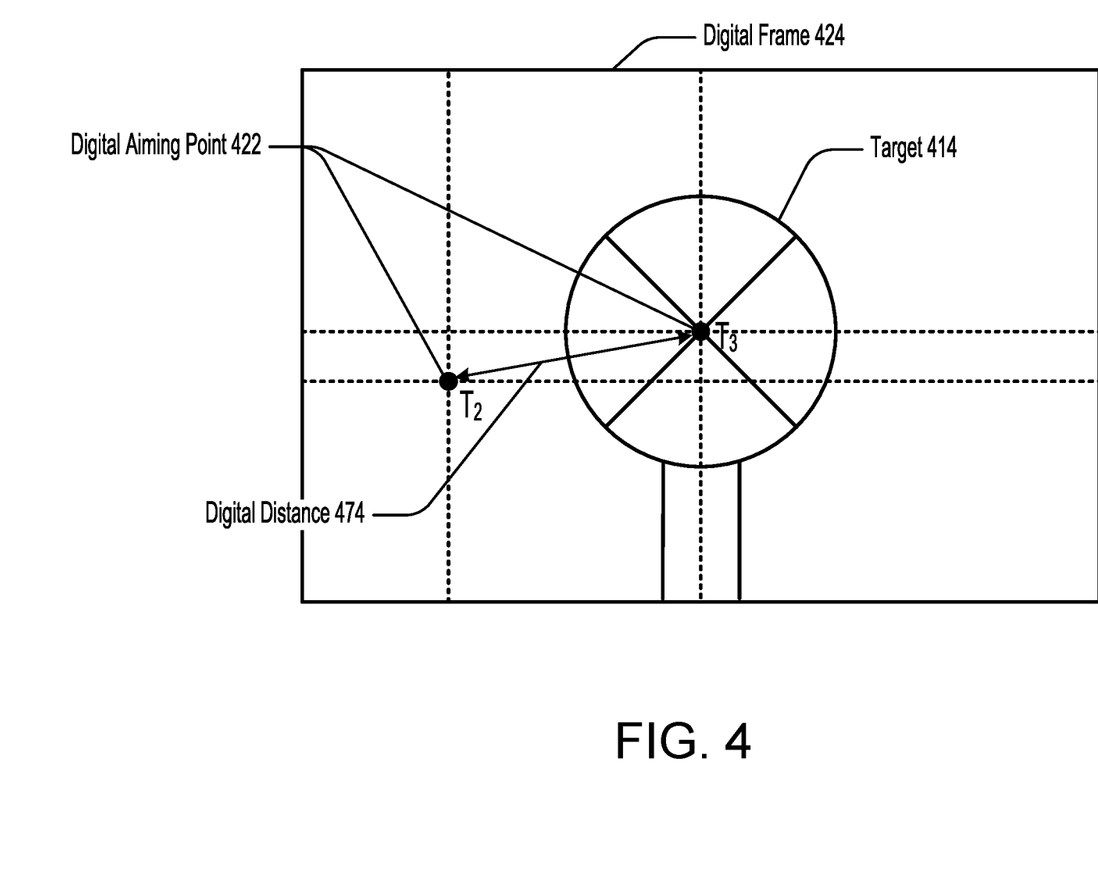
FIG. 4 illustrates an example computation of a digital distance.

FIG. 4 illustrates an example computation of a digital distance 474, in accordance with some embodiments of the present disclosure. In some embodiments, digital distance 474 may be calculated as the distance within a digital frame 424 between a digital aiming point 422 at time $T_2$ and digital aiming point 422 at time $T_3$ (which may be equivalent to the position of the center of target 414 within digital frame 424). In some embodiments, digital distance 474 is expressed as a number of pixels (e.g., 46.8 pixels) and can be found by determining the distance between two coordinates within digital frame 424.

Figure 5:
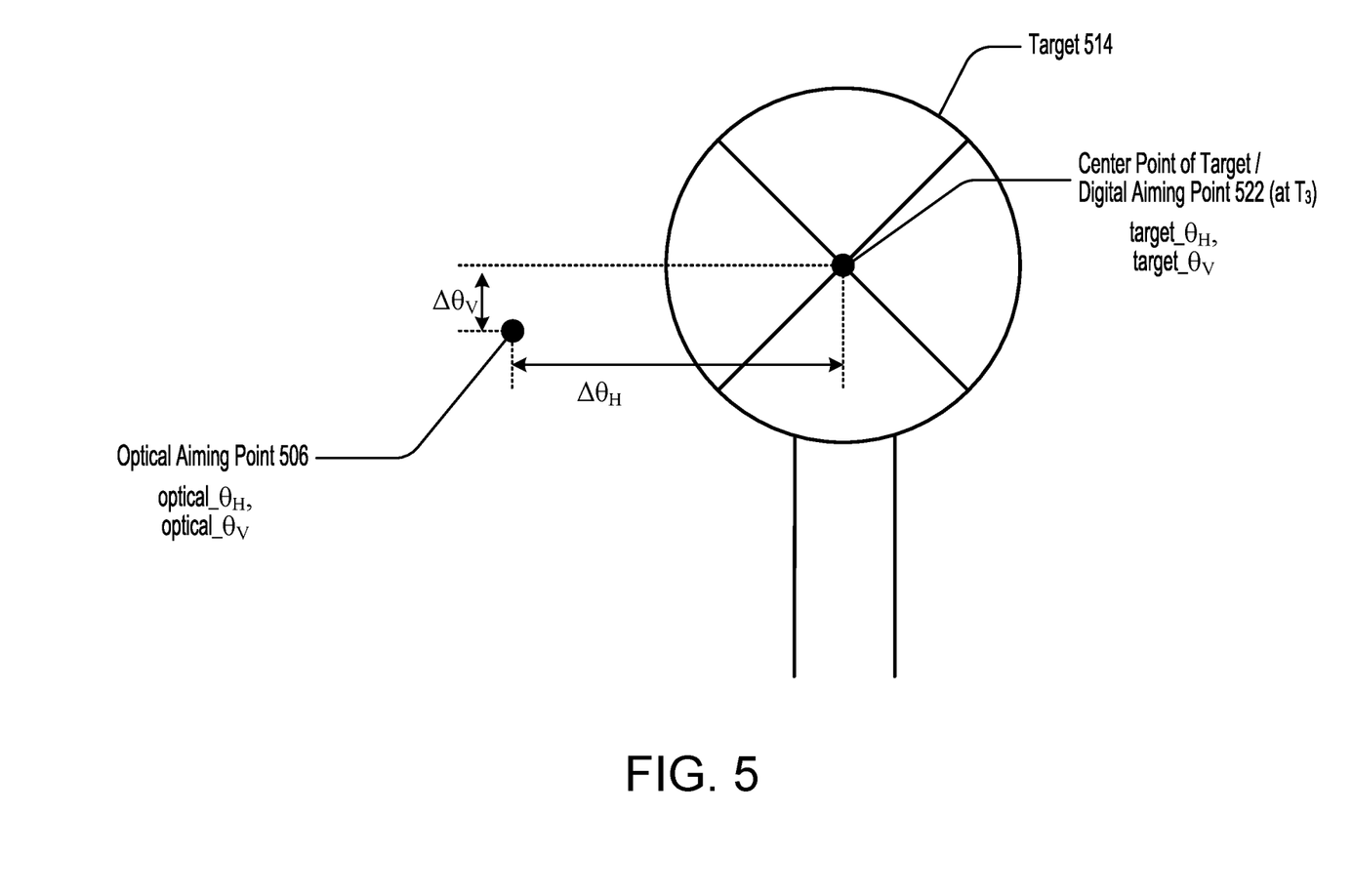
FIG. 5 illustrates an example computation of an offset angle and an angle associated with a center point of a target.

FIG. 5 illustrates an example computation of an offset angle (which may correspond to one or both of offset angles $\Delta\theta_H$, $\Delta\theta_V$) and an angle associated with a center point of a target 514 (which may correspond to one or both of angles target_$\theta_H$, target_$\theta_V$), in accordance with some embodiments of the present disclosure. The offset angles $\Delta\theta_H$, $\Delta\theta_V$ may be the angle(s) between optical aiming point 506 and the center point of target 514 (or digital aiming point 522 at $T_3$) with respect to the total station, wherein $\Delta\theta_H$ is the offset angle in the horizontal direction and $\Delta\theta_V$ is the offset angle in the vertical direction. The offset angles $\Delta\theta_H$, $\Delta\theta_V$ may be computed using the digital distance and the slope distance as measured by the EDM unit. For example, the slope distance may be used to compute a conversion rate between pixels and physical distance (e.g., 1.3 mm per pixel), which may be applied to the digital distance. The converted digital distance and the slope distance may be used to compute the offset angles $\Delta\theta_H$, $\Delta\theta_V$ using, for example, the tangent or arctan functions.

Upon measuring the angle associated with optical aiming point 506 (angles optical_$\theta_H$, optical_$\theta_V$) and computing the offset angle (offset angles $\Delta\theta_H$, $\Delta\theta_V$), the angle associated with the center point of target 514 (angles target_$\theta_H$, target_$\theta_V$) may be computed by combining the angle associated with optical aiming point 506 with the offset angle. For example, in some embodiments, the angle associated with the center point of target 514 may be computed by adding the offset angle to the angle associated with optical aiming point 506 as follows:

$$\text{target\_}\theta_H = \text{optical\_}\theta_H + \Delta\theta_H$$

$$\text{target\_}\theta_V = \text{optical\_}\theta_V + \Delta\theta_V$$

Figure 6:
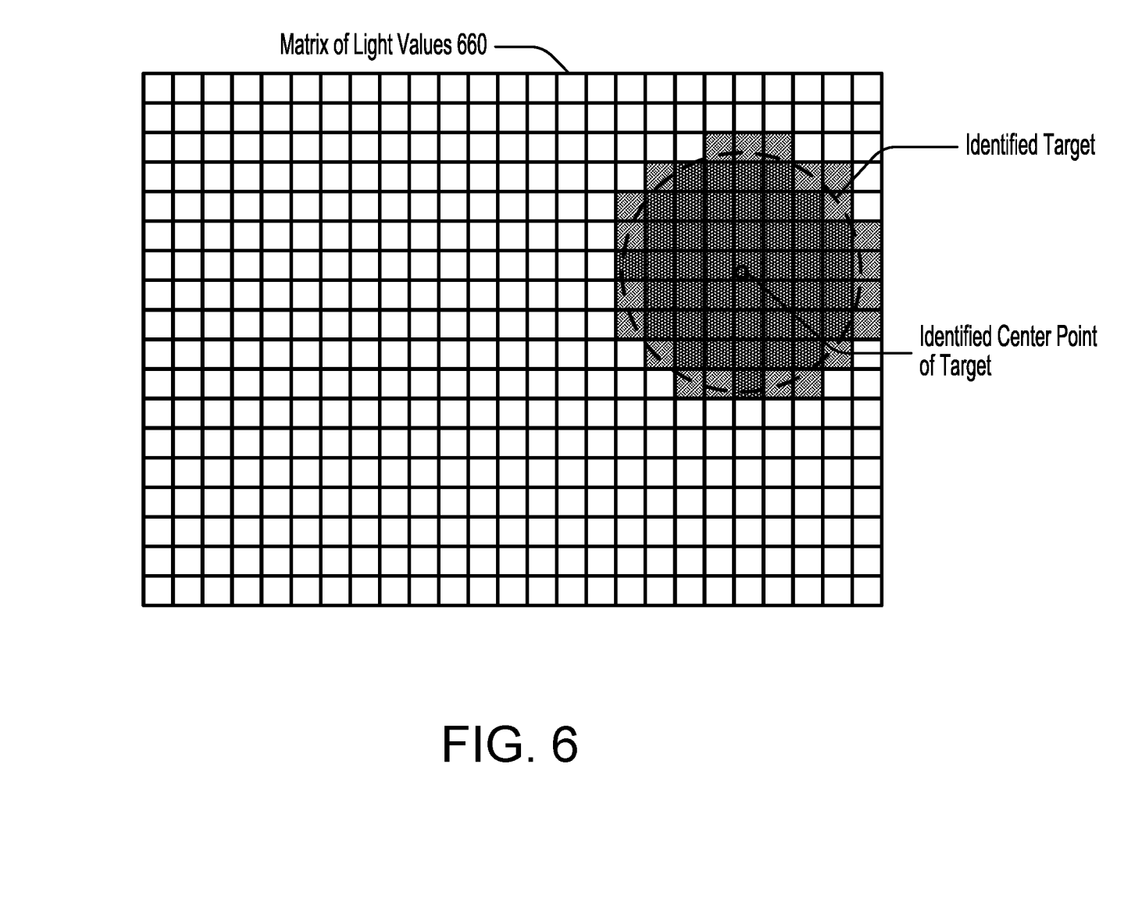
FIG. 6 illustrates an example of a matrix of light values.

FIG. 6 illustrates an example of a matrix of light values 660, in accordance with some embodiments of the present disclosure. Matrix of light values 660 may be captured using a pixelated image sensor and may be used to determine a position of the center point of the target within a digital frame. Each value of matrix of light values 660 may correspond to a different pixel of the pixelated image sensor and may represent, for example, an intensity of received light or a time-of-flight delay between emitting and receiving light. Pixels having higher values/intensities may be determined to correspond to the target, and groupings of such pixels may be analyzed to identify the position of the target and its center within the matrix.

Figure 7:
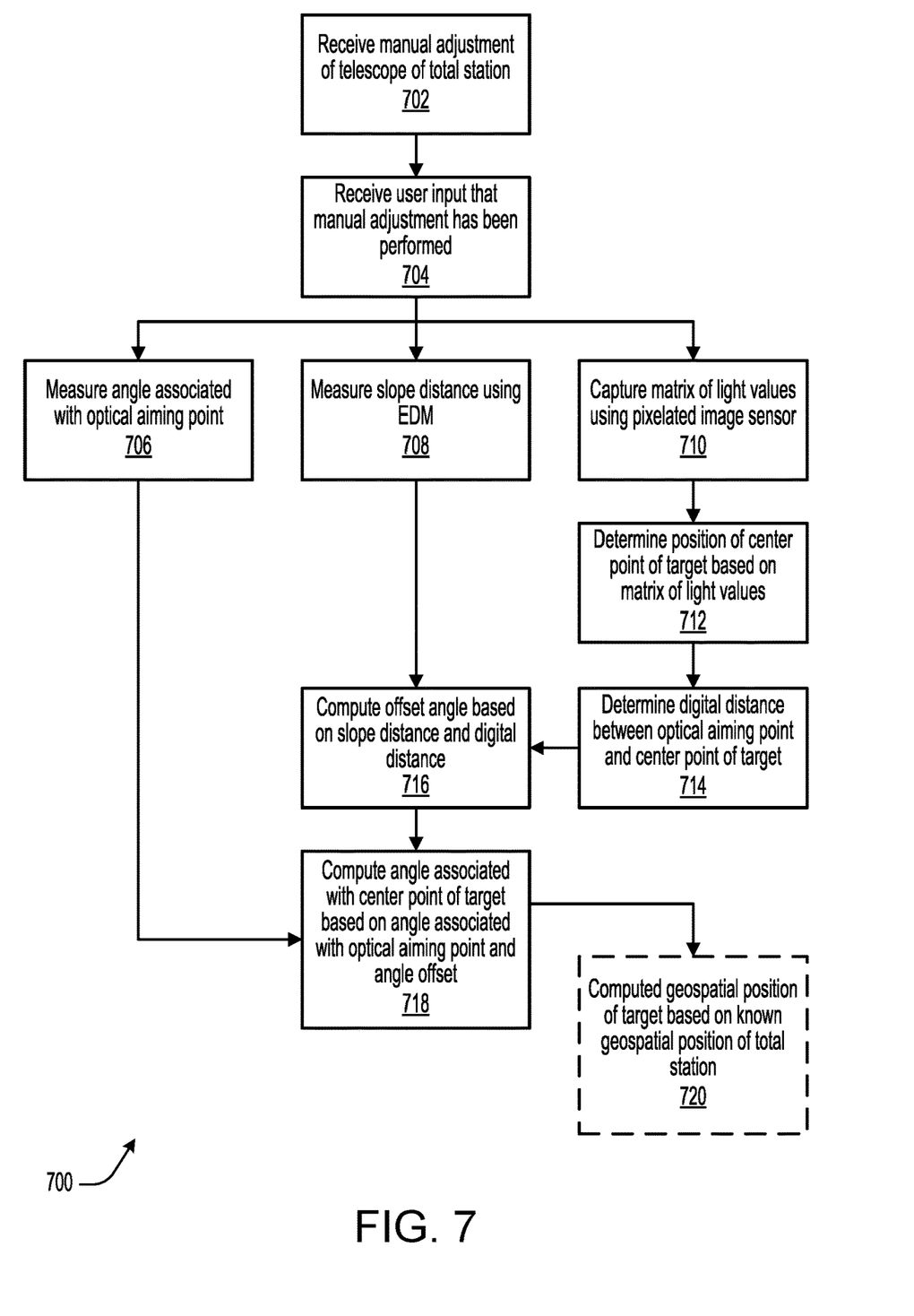
FIG. 7 illustrates a method of operating a total station.

FIG. 7 illustrates a method 700 of operating a total station (e.g., total stations 102, 202), in accordance with some embodiments of the present disclosure. One or more steps of method 700 may be omitted during performance of method 700, and steps of method 700 may be performed in any order and/or in parallel. One or more steps of method 700 may be performed by one or more processors, such as those included in an onboard computer (e.g., onboard computer 246). Method 700 may be implemented as a computer-readable medium or computer program product comprising instructions which, when the program is executed by one or more computers, cause the one or more computers to carry out the steps of method 700.

At step 702, a manual adjustment of a telescope (e.g., telescopes 104, 204) of the total station is received. The manual adjustment may be performed by a user of the total station by applying physical force to the total station to cause rotation of one or more rotatable connections (e.g., horizontal rotatable connection 250, vertical rotatable connection 252). As a result of the manual adjustment, a target (e.g., targets 114, 314, 414, 514) may be set at least partially within a FOV (e.g., EDM FOVs 132, 332) of an EDM unit (e.g., EDM unit 230) of the total station, and an optical aiming point (e.g., optical aiming points 106, 306, 506) associated with the telescope may be misaligned from a center point (or simply "center") of the target by an offset angle (e.g., offset angles $\Delta\theta_H$, $\Delta\theta_V$). The optical aiming point may be completely misaligned from the entire target or may be aligned with a portion of the target (outside of the center point of the target).

At step 704, a user input is received. The user input may indicate that the manual adjustment has been performed. The user input may be received via a user interface (e.g., interface 264) of the total station. For example, the user may press a button, flip a switch, or turn a knob to indicate that the manual adjustment has been performed and that the user is ready for measurements to be performed while the telescope in its current physical position. In some embodiments, in response to the user input, the telescope may be locked to temporarily prevent any further manual adjustments of the telescope.

At step 706, an angle associated with the optical aiming point (e.g., angles optical_$\theta_H$, optical_$\theta_V$) is measured. The angle associated with the optical aiming point may be measured in response to receiving the user input. The angle associated with the optical aiming point may be expressed relative to a horizontal axis (e.g., horizontal axis 268) and/or a vertical axis (e.g., vertical axis 270). The angle associated with the optical aiming point may be measured using one or more angle sensors of the total station. In some embodiments, the one or more angle sensors may be coupled to the one or more rotatable connections.

At step 708, a slope distance between the total station and the target is measured using the EDM unit. The slope distance may be measured in response to receiving the user input. To measure the slope distance, the EDM unit may emit and receive light (e.g., infrared light, visible light, etc.) through the objective lens of the telescope to perform the EDM measurement. The comparison of the received light with the emitted light may yield the slope distance. The slope distance may be accurately measured if the target is at least partially within the FOV of the EDM unit. In some instances, the EDM measurement signal may be analyzed to determine whether the EDM measurement has sufficient accuracy (e.g., based on the signal-to-noise ratio of the EDM measurement signal) to verify that the overlap between the FOV of the EDM unit and the target is sufficient and more than just borderline. In some instances, if the EDM measurement is not sufficiently accurate, the total station may alert the user to perform another manual adjustment to bring the optical aiming point closer to the target.

At step 710, a matrix of light values (e.g., matrix of light values 660) is captured using a pixelated image sensor (e.g., pixelated image sensor 258). The matrix of light values may be measured in response to receiving the user input. Each light value of the matrix of light values may correspond to a specific pixel in the FOV of the pixelated image sensor. Prior to capturing the matrix of light values, a light emitter (e.g., light emitter 256) may emit light through the objective lens of the telescope at a larger FOV than the light emitted by the EDM unit.

At step 712, a position of the center point of the target is determined based on the matrix of light pixels. The shape and specific position of a reflector (e.g., reflector 116) of the target may be identified within the matrix of light values. The position of the center point of the target may be expressed as pixel coordinates within a digital frame. In some embodiments, a digital aiming point (e.g., digital aiming points 122, 322, 422, 522) within the digital frame may be set to (or moved to) the position of the center point of the target, which may be referred to a second digital aiming point position, where a first digital aiming point position may be set to the optical aiming point after the manual adjustment has been performed. In some instances, if the position of the center point of the target cannot be accurately determined (e.g., if the target is not sufficiently contained within the FOV of the pixelated image sensor), the total station may alert the user to perform another manual adjustment to bring the optical aiming point closer to the target.

At step 714, a digital distance (e.g., digital distance 474) between the optical aiming point and the center point of the target is determined. In some embodiments, the digital distance may equivalently be determined between the first digital aiming point position and the second digital aiming point position (set to the position of the center point of the target). The digital distance may be calculated as the distance within the digital frame between the first digital aiming point position and the second digital aiming point position. The digital distance may be expressed as a number of pixels.

At step 716, an offset angle (e.g., offset angles $\Delta\theta_H$, $\Delta\theta_V$) is computed based on the slope distance and the digital distance. The offset angle may be an angle between the optical aiming point and the center point of the target. The slope distance may be used to compute a conversion rate between pixels and physical distance. The conversion rate may be applied to the digital distance to convert the digital distance into an offset distance. The converted digital distance (or offset distance) and the slope distance may be used to compute the offset angles using trigonometric functions.

At step 718, an angle associated with the center point of the target (e.g., angles target_$\theta_H$, target_$\theta_V$) is computed. The angle associated with the center point of the target may be computed by combining the angle associated with the optical aiming point with the offset angle. In some embodiments, the angle associated with the center point of the target may be computed by adding the offset angle to the angle associated with the optical aiming point.

At step 720, a geospatial position of the target is computed based on a geospatial position of the total station, the angle associated with the center point of the target, and the slope distance. The geospatial position of the total station may be previously known or may be measured using a Global Navigation Satellite System (GNSS) receiver mounted to or near the total station.

Figure 8:
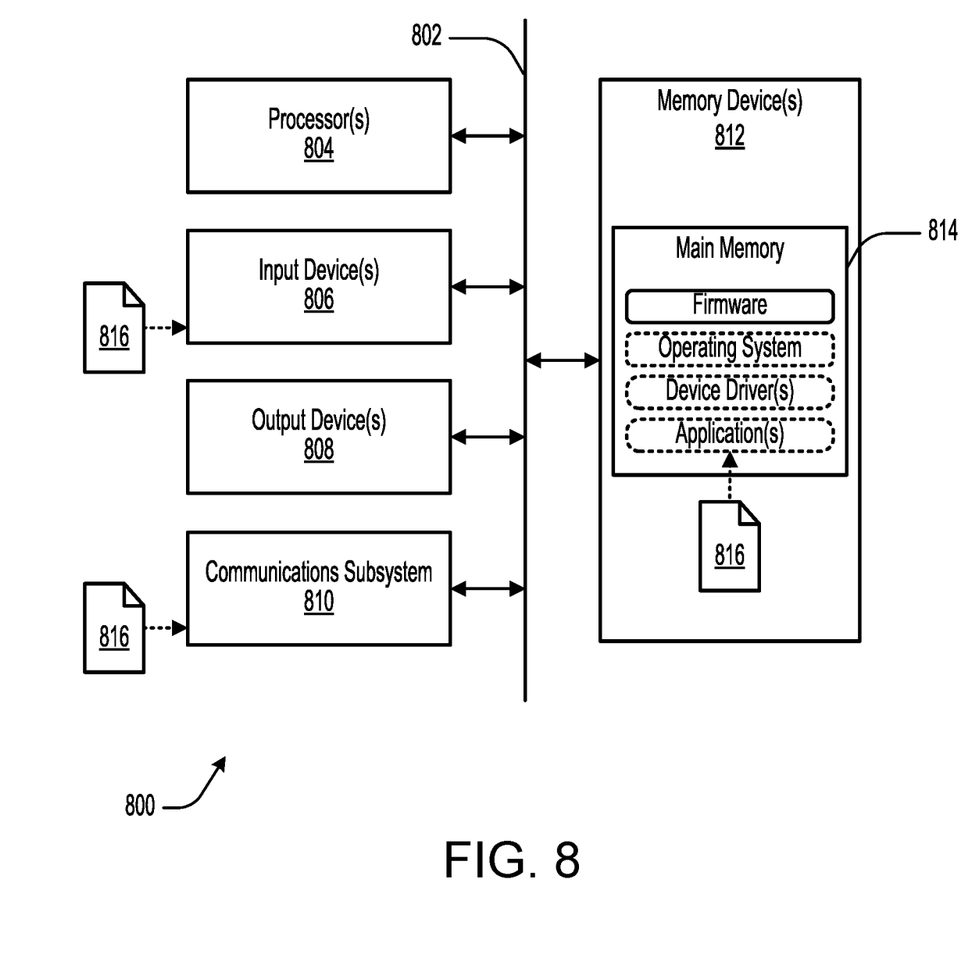
FIG. 8 illustrates an example computer system comprising various hardware elements.

FIG. 8 illustrates an example computer system 800 comprising various hardware elements, in accordance with some embodiments of the present disclosure. Computer system 800 may be incorporated into or integrated with devices described herein and/or may be configured to perform some or all of the steps of the methods provided by various embodiments. For example, in various embodiments, computer system 800 may be incorporated into onboard computer 246 and/or may be configured to perform method 700. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

In the illustrated example, computer system 800 includes a communication medium 802, one or more processor(s) 804, one or more input device(s) 806, one or more output device(s) 808, a communications subsystem 810, and one or more memory device(s) 812. Computer system 800 may be implemented using various hardware implementations and embedded system technologies. For example, one or more elements of computer system 800 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device, such as an SoC FPGA, among other possibilities.

The various hardware elements of computer system 800 may be communicatively coupled via communication medium 802. While communication medium 802 is illustrated as a single connection for purposes of clarity, it should be understood that communication medium 802 may include various numbers and types of communication media for transferring data between hardware elements. For example, communication medium 802 may include one or more wires (e.g., conductive traces, paths, or leads on a printed circuit board (PCB) or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 802 may include one or more buses connecting pins of the hardware elements of computer system 800. For example, communication medium 802 may include a bus that connects processor(s) 804 with main memory 814, referred to as a system bus, and a bus that connects main memory 814 with input device(s) 806 or output device(s) 808, referred to as an expansion bus. The system bus may itself consist of several buses, including an address bus, a data bus, and a control bus. The address bus may carry a memory address from processor(s) 804 to the address bus circuitry associated with main memory 814 in order for the data bus to access and carry the data contained at the memory address back to processor(s) 804. The control bus may carry commands from processor(s) 804 and return status signals from main memory 814. Each bus may include multiple wires for carrying multiple bits of information and each bus may support serial or parallel transmission of data.

Processor(s) 804 may include one or more central processing units (CPUs), graphics processing units (GPUs), neural network processors or accelerators, digital signal processors (DSPs), and/or other general-purpose or special-purpose processors capable of executing instructions. A CPU may take the form of a microprocessor, which may be fabricated on a single IC chip of metal-oxide-semiconductor field-effect transistor (MOSFET) construction. Processor(s) 804 may include one or more multi-core processors, in which each core may read and execute program instructions concurrently with the other cores, increasing speed for programs that support multithreading.

Input device(s) 806 may include one or more of various user input devices such as a mouse, a keyboard, a microphone, as well as various sensor input devices, such as an image capture device, a pressure sensor (e.g., barometer, tactile sensor), a temperature sensor (e.g., thermometer, thermocouple, thermistor), a movement sensor (e.g., accelerometer, gyroscope, tilt sensor), a light sensor (e.g., photodiode, photodetector, charge-coupled device), and/or the like. Input device(s) 806 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 808 may include one or more of various devices that convert information into human-readable form, such as without limitation a display device, a speaker, a printer, a haptic or tactile device, and/or the like. Output device(s) 808 may also include devices for writing to removable storage devices or other removable media, such as those described in reference to input device(s) 806. Output device(s) 808 may also include various actuators for causing physical movement of one or more components. Such actuators may be hydraulic, pneumatic, electric, and may be controlled using control signals generated by computer system 800.

Communications subsystem 810 may include hardware components for connecting computer system 800 to systems or devices that are located external to computer system 800, such as over a computer network. In various embodiments, communications subsystem 810 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 812 may include the various data storage devices of computer system 800. For example, memory device(s) 812 may include various types of computer memory with various response times and capacities, from faster response times and lower capacity memory, such as processor registers and caches (e.g., L0, L1, L2), to medium response time and medium capacity memory, such as random-access memory (RAM), to lower response times and lower capacity memory, such as solid-state drives and hard drive disks. While processor(s) 804 and memory device(s) 812 are illustrated as being separate elements, it should be understood that processor(s) 804 may include varying levels of on-processor memory, such as processor registers and caches that may be utilized by a single processor or shared between multiple processors.

Memory device(s) 812 may include main memory 814, which may be directly accessible by processor(s) 804 via the memory bus of communication medium 802. For example, processor(s) 804 may continuously read and execute instructions stored in main memory 814. As such, various software elements may be loaded into main memory 814 to be read and executed by processor(s) 804 as illustrated in FIG. 8. Typically, main memory 814 is volatile memory, which loses all data when power is turned off and accordingly needs power to preserve stored data. Main memory 814 may further include a small portion of non-volatile memory containing software (e.g., firmware, such as BIOS) that is used for reading other software stored in memory device(s) 812 into main memory 814. In some embodiments, the volatile memory of main memory 814 is implemented as RAM, such as dynamic random-access memory (DRAM), and the non-volatile memory of main memory 814 is implemented as read-only memory (ROM), such as flash memory, erasable programmable read-only memory (EPROM), or electrically erasable programmable read-only memory (EEPROM).

Computer system 800 may include software elements, shown as being currently located within main memory 814, which may include an operating system, device driver(s), firmware, compilers, and/or other code, such as one or more application programs, which may include computer programs provided by various embodiments of the present disclosure. Merely by way of example, one or more steps described with respect to any methods discussed above, may be implemented as instructions 816, which are executable by computer system 800. In one example, such instructions 816 may be received by computer system 800 using communications subsystem 810 (e.g., via a wireless or wired signal that carries instructions 816), carried by communication medium 802 to memory device(s) 812, stored within memory device(s) 812, read into main memory 814, and executed by processor(s) 804 to perform one or more steps of the described methods. In another example, instructions 816 may be received by computer system 800 using input device(s) 806 (e.g., via a reader for removable media), carried by communication medium 802 to memory device(s) 812, stored within memory device(s) 812, read into main memory 814, and executed by processor(s) 804 to perform one or more steps of the described methods.

In some embodiments of the present disclosure, instructions 816 are stored on a computer-readable storage medium (or simply computer-readable medium). Such a computer-readable medium may be non-transitory and may therefore be referred to as a non-transitory computer-readable medium. In some cases, the non-transitory computer-readable medium may be incorporated within computer system 800. For example, the non-transitory computer-readable medium may be one of memory device(s) 812 (as shown in FIG. 8). In some cases, the non-transitory computer-readable medium may be separate from computer system 800. In one example, the non-transitory computer-readable medium may be a removable medium provided to input device(s) 806 (as shown in FIG. 8), such as those described in reference to input device(s) 806, with instructions 816 being read into computer system 800 by input device(s) 806. In another example, the non-transitory computer-readable medium may be a component of a remote electronic device, such as a mobile phone, that may wirelessly transmit a data signal that carries instructions 816 to computer system 800 and that is received by communications subsystem 810 (as shown in FIG. 8).

Instructions 816 may take any suitable form to be read and/or executed by computer system 800. For example, instructions 816 may be source code (written in a human-readable programming language such as Java, C, C++, C#, Python), object code, assembly language, machine code, microcode, executable code, and/or the like. In one example, instructions 816 are provided to computer system 800 in the form of source code, and a compiler is used to translate instructions 816 from source code to machine code, which may then be read into main memory 814 for execution by processor(s) 804. As another example, instructions 816 are provided to computer system 800 in the form of an executable file with machine code that may immediately be read into main memory 814 for execution by processor(s) 804. In various examples, instructions 816 may be provided to computer system 800 in encrypted or unencrypted form, compressed or uncompressed form, as an installation package or an initialization for a broader software deployment, among other possibilities.

In one aspect of the present disclosure, a system (e.g., computer system 800) is provided to perform methods in accordance with various embodiments of the present disclosure. For example, some embodiments may include a system comprising one or more processors (e.g., processor(s) 804) that are communicatively coupled to a non-transitory computer-readable medium (e.g., memory device(s) 812 or main memory 814). The non-transitory computer-readable medium may have instructions (e.g., instructions 816) stored therein that, when executed by the one or more processors, cause the one or more processors to perform the methods described in the various embodiments.

In another aspect of the present disclosure, a computer-program product that includes instructions (e.g., instructions 816) is provided to perform methods in accordance with various embodiments of the present disclosure. The computer-program product may be tangibly embodied in a non-transitory computer-readable medium (e.g., memory device(s) 812 or main memory 814). The instructions may be configured to cause one or more processors (e.g., processor(s) 804) to perform the methods described in the various embodiments.

In another aspect of the present disclosure, a non-transitory computer-readable medium (e.g., memory device(s) 812 or main memory 814) is provided. The non-transitory computer-readable medium may have instructions (e.g., instructions 816) stored therein that, when executed by one or more processors (e.g., processor(s) 804), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of operating a total station, the method comprising:
   receiving a manual adjustment of a telescope of the total station to set a target at last partially within a field of view (FOV) of an electronic distance measurement (EDM) unit of the total station, wherein, after the manual adjustment, an optical aiming point associated with the telescope is misaligned from a center point of the target by an offset angle;
   receiving, via a user interface of the total station, a user input indicating that the manual adjustment has been performed;
   in response to receiving the user input:
     measuring a slope distance between the total station and the target using the EDM unit; and
     measuring an angle associated with the optical aiming point;
   computing the offset angle between the optical aiming point and the center point of the target based on the slope distance; and
   computing an angle associated with the center point of the target based on the angle associated with the optical aiming point and the offset angle.

2. The method of claim 1, further comprising:
   in response to receiving the user input:
     capturing, using a pixelated image sensor of the total station, a matrix of light values; and
     determining a position of the center point of the target based on the matrix of light values.

3. The method of claim 2, wherein the EDM unit and the pixelated image sensor are configured to receive light entering into the telescope.

4. The method of claim 2, further comprising:
   generating a digital aiming point within a digital frame;
   in response to receiving the user input, moving the digital aiming point from a first digital aiming point position to a second digital aiming point position to align with the position of the center point of the target; and
   determining a digital distance between the first digital aiming point position and the second digital aiming point position.

5. The method of claim 4, wherein the offset angle between the optical aiming point and the center point of the target is computed further based on the digital distance.

6. The method of claim 4, further comprising:
   displaying, on a display of the total station, the digital frame including the digital aiming point.

7. The method of claim 1, further comprising:
   in response to receiving the user input:
     locking the telescope to temporarily prevent further manual adjustment of the telescope.

8. The method of claim 1, wherein the target includes a reflector prism.

9. The method of claim 1, wherein the total station lacks rotary actuators that perform automatic adjustment of the telescope.

10. A non-transitory computer-readable medium comprising instructions that, when executed by one or more processors, cause the one or more processors to perform operations comprising:

receiving, via a user interface of a total station, a user input indicating that a manual adjustment of a telescope of a total station has been performed, the manual adjustment causing a target to be set at last partially within a field of view (FOV) of an electronic distance measurement (EDM) unit of the total station, wherein, after the manual adjustment, an optical aiming point associated with the telescope is misaligned from a center point of the target by an offset angle;

in response to receiving the user input:
causing a slope distance between the total station and the target to be measured using the EDM unit; and
causing an angle associated with the optical aiming point to be measured;

computing the offset angle between the optical aiming point and the center point of the target based on the slope distance; and computing an angle associated with the center point of the target based on the angle associated with the optical aiming point and the offset angle.

11. The non-transitory computer-readable medium of claim 10, wherein the operations further comprise:
in response to receiving the user input:
causing a matrix of light values to be captured using a pixelated image sensor of the total station; and
determining a position of the center point of the target based on the matrix of light values.

12. The non-transitory computer-readable medium of claim 11, wherein the operations further comprise:
generating a digital aiming point within a digital frame;
in response to receiving the user input, moving the digital aiming point from a first digital aiming point position to a second digital aiming point position to align with the position of the center point of the target; and
determining a digital distance between the first digital aiming point position and the second digital aiming point position.

13. The non-transitory computer-readable medium of claim 12, wherein the offset angle between the optical aiming point and the center point of the target is computed further based on the digital distance.

14. The non-transitory computer-readable medium of claim 12, wherein the operations further comprise:
displaying, on a display of the total station, the digital frame including the digital aiming point.

15. The non-transitory computer-readable medium of claim 10, wherein the operations further comprise:
in response to receiving the user input:
locking the telescope to temporarily prevent further manual adjustment of the telescope.

16. A total station comprising:
a telescope;
an electronic distance measurement (EDM) unit integrated with the telescope, wherein a manual adjustment of the telescope causes a target to be set at last partially within a field of view (FOV) of the EDM unit, wherein, after the manual adjustment, an optical aiming point associated with the telescope is misaligned from a center point of the target by an offset angle; and
an onboard computer communicatively coupled to the EDM unit, the onboard computer configured to:
receive, via a user interface of the total station, a user input indicating that the manual adjustment has been performed;
in response to receiving the user input:
cause a slope distance between the total station and the target to be measured using the EDM unit; and
cause an angle associated with the optical aiming point to be measured;
compute the offset angle between the optical aiming point and the center point of the target based on the slope distance; and
compute an angle associated with the center point of the target based on the angle associated with the optical aiming point and the offset angle.

17. The total station of claim 16, further comprising:
a pixelated image sensor communicatively coupled to the onboard computer, and wherein the onboard computer is further configured to:
in response to receiving the user input:
cause a matrix of light values to be captured using the pixelated image sensor; and
determine a position of the center point of the target based on the matrix of light values.

18. The total station of claim 17, wherein the EDM unit and the pixelated image sensor are configured to receive light entering into the telescope.

19. The total station of claim 16, wherein the target includes a reflector prism.

20. The total station of claim 16, wherein the total station lacks rotary actuators that perform automatic adjustment of the telescope.

* * * * *